United States Patent [19]
Friedland et al.

[11] 3,726,296
[45] Apr. 10, 1973

[54] FLUIDIC CONTROL SYSTEM AND METHOD FOR CALIBRATING SAME

[75] Inventors: Harry Friedland; Addison W. Langill, Jr., both of Salt Lake City, Utah

[73] Assignee: Process Systems, Inc., Salt Lake City, Utah

[22] Filed: Aug. 9, 1971

[21] Appl. No.: 169,940

Related U.S. Application Data

[63] Continuation-in-part of Ser. No. 142,681, May 12, 1971, abandoned.

[52] U.S. Cl. .................137/1, 137/599, 137/487.5, 251/30, 73/4
[51] Int. Cl. .............................................G05d 7/03
[58] Field of Search..................137/599, 599.1, 561, 137/624.27, 487.5, 601, 552.2

[56] References Cited

UNITED STATES PATENTS 3,072,146  1/1963  Gizeski.............................137/599 X
3,115,923  12/1963  Kellner et al. ....................137/599 X Primary Examiner—Henry T. Klinksiek
Assistant Examiner—Robert J. Miller
Attorney—LeRoy T. Rahn et al.

[57] ABSTRACT

A source of a fluid at a constant pressure is coupled to a manifold and the manifold is coupled to a receiver of the fluid at a constant pressure lower than the source pressure. One of the couplings comprises an orifice having a fixed cross-sectional area. The other coupling comprises a plurality of individually actuatable, digital valve elements. A device that is movable responsive to pressure, such as an actuator for an analog valve plug, is coupled to the manifold. The states of the digital valve elements are controlled by digital signals representative of a command, so the movement of the member is representative of the command. Each digital valve element is designed so its effective orifice area in the open state can be adjusted after assembly. The arrangement is calibrated by individually adjusting the digital valve elements to compensate for the effects of tolerance variations.

27 Claims, 8 Drawing Figures

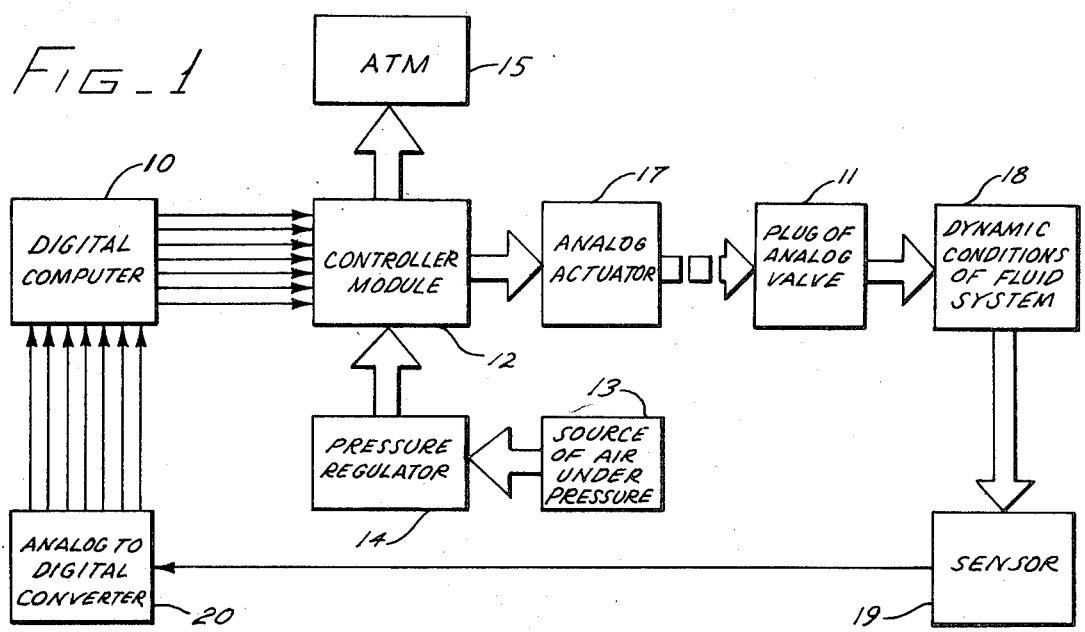
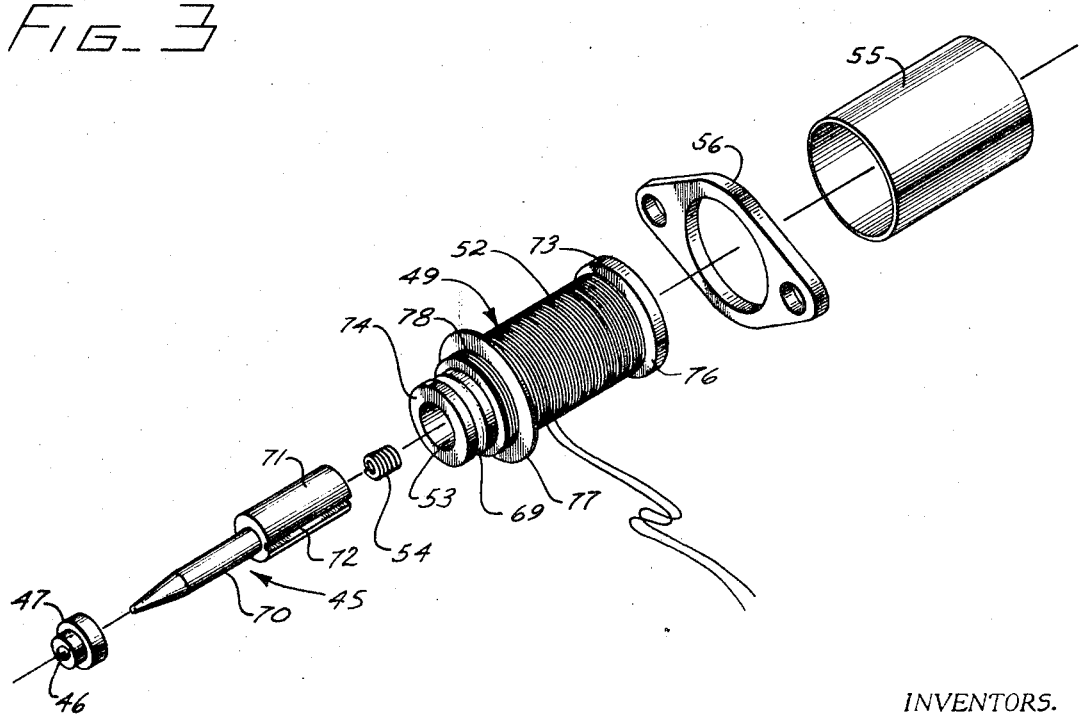

3,726,296
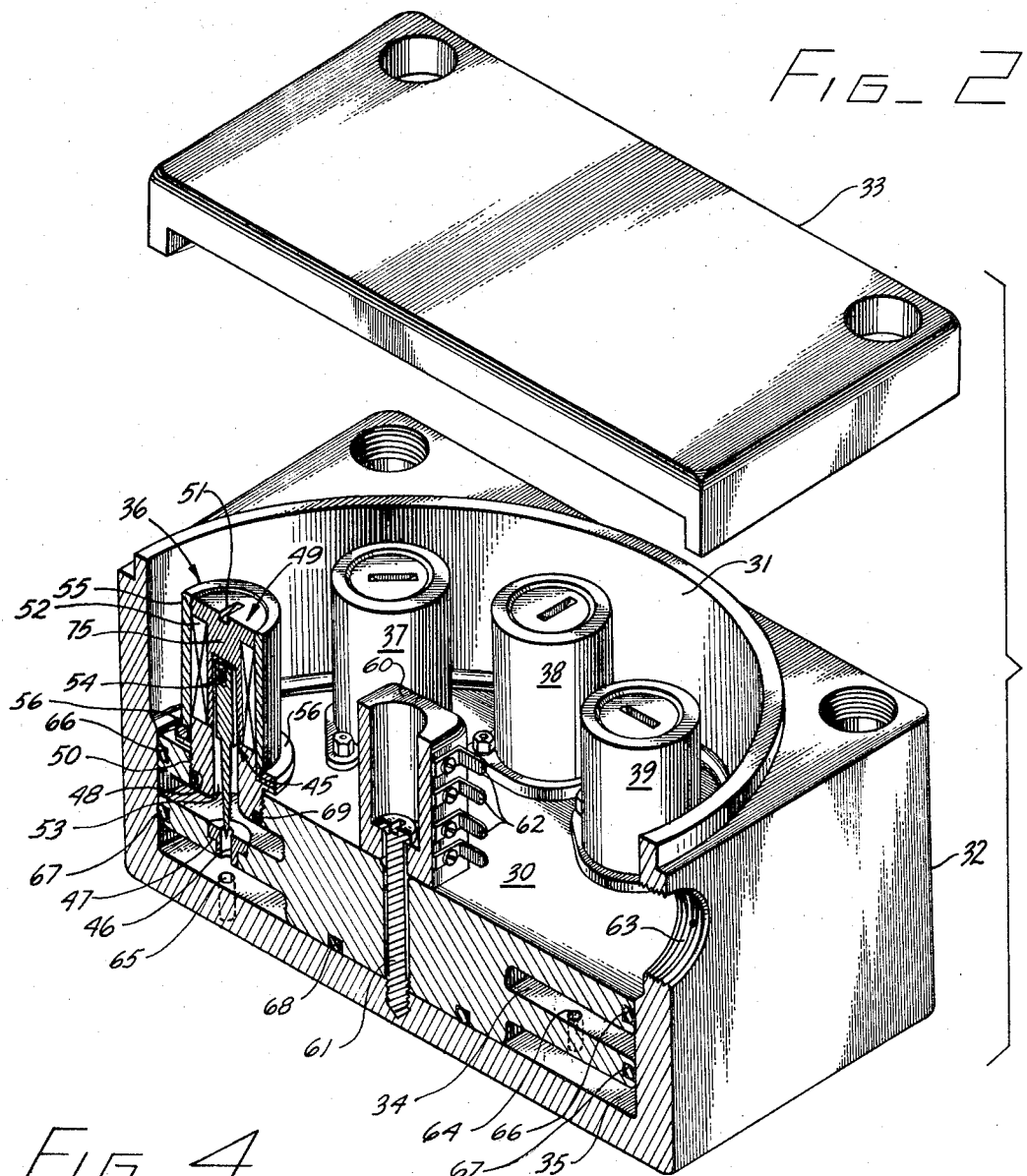
Fig_2
Fig_4
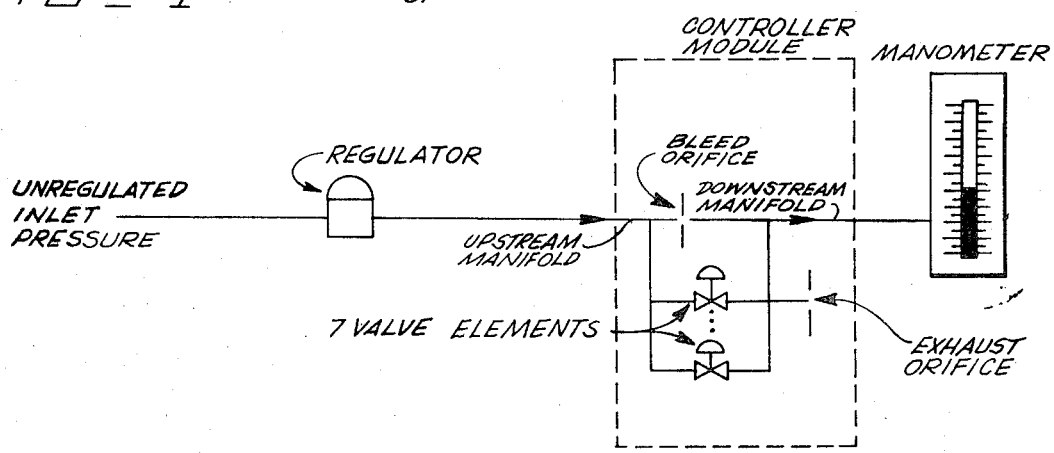

FLUIDIC CONTROL SYSTEM AND METHOD FOR CALIBRATING SAME

CROSS-REFERENCE TO RELATED APPLICATIONS

This is a continuation-in-part of application Ser. No. 142,681, filed May 12, 1971, and now abandoned.

BACKGROUND OF THE INVENTION

This invention relates to the field of fluid flow control and, more particularly, to a fluidic control system that produces a fluid pressure representative of a digital command signal.

The flow of fluid through a system is conventionally controlled by an analog valve comprising an orifice and a movable plug. The flow rate through the system is determined by the position of the plug relative to the orifice, i.e., by the extent to which the plug blocks the orifice. It has become common practice in many chemical and petroleum processing plants to automate the operations with a digital computer. The digital computer generates a digital command in electrical form for positioning the analog valve plug either directly through a pressure responsive actuator or indirectly through a closed loop pneumatic controller. Compatibility is achieved between the digital computer and the actuator or controller by an electrical digital-to-analog converter and a pressure converter that is responsive to the analog signal. Usually, it is not practical to place the digital-to-analog converter or the digital computer at the site of the processing operation. Thus, an analog voltage-to-current converter is also needed to transmit the analog signal to the site of the pressure converter and analog valve; otherwise, the analog signal would be degraded by the long lines over which it is transmitted to the site.

The requirement for the above converting equipment can be eliminated by substituting a system of individually actuatable, bistable digital valve elements for the analog valve. The orifice areas of the digital valve elements are weighted in accordance with the binary code of the digital output of the computer. Particularly effective fluid flow control systems of this type are disclosed in a copending application of Roger S. Hutton, Ser. No. 64,142, filed Aug. 3, 1970, a copending application of Harry Friedland, Ser. No. 111,945, filed Feb. 2, 1971, and an application of Harry Friedland and Addison W. Langill, Jr., titled, "Fluid Flow Control System," and filed concurrently herewith, all assigned to the assignee of the present application.

Many processing plants are called upon to handle fluids having very high pressures and large flow rates. As a result, the valve structures are often massive in size and elaborate closed loop controllers are needed to furnish adequate power to operate the valves. In existing plants that employ analog valves, the controllers are usually pneumatic; replacement of the analog valves would render obsolete expensive pneumatic controllers as well as the replaced valves themselves. Consequently, it may not be economical to replace the existing analog valves with a system of digital valve elements in many plants.

SUMMARY OF THE INVENTION

According to the invention, a plurality of individually actuatable, digital valve elements are employed to establish a pressure that directly controls the plug position of an analog valve, serves as a set point value for a pneumatic controller, or actuates some other pressure sensitive device. The established pressure is representative of the combination of states of the digital valve elements, which are controlled by digital signals representing a command in a weighted code. Thus, a plug actuating pressure can be produced directly from the digital output of a computer without an electrical digital-to-analog converter, an analog voltage-to-current converter, and a pressure converter. Instead of employing digital valve elements to handle the fluid being processed in a plant, they are employed to handle the control fluid for positioning an analog valve that handles the process fluid. The control fluid involves much lower pressures and smaller flow rates. Used in this way, a small relatively inexpensive system of digital valve elements can couple a digital computer to the existing analog, pressure responsive equipment in a processing plant that handles high process fluid pressures and large flow rates, rather than replacing all this existing equipment with a large relatively expensive system of digital valve elements.

Specifically, a source of a fluid at a constant pressure is coupled to a fluid chamber and the chamber is coupled to a receiver of the fluid at a constant pressure lower than the fluid source. One of the couplings comprises an orifice having a fixed cross-sectional area. The other coupling comprises a plurality of individually actuatable, preferably bistable, digital valve elements. The digital valve elements are opened and closed responsive to a plurality of binary signals together representing a command in a weighted binary code, such as the digital output from a computer. The fluid chamber is coupled to a device that is sensitive or responsive to pressure, such as an actuator mechanically coupled to the plug of an analog valve.

Preferably, the digital valve elements are arranged in a controller module to interconnect first and second manifolds formed inside the module. The second manifold, which constitutes the fluid chamber, is coupled by the orifice having the fixed cross-sectional area to the atmosphere, which constitutes the fluid receiver. A fluid under pressure is supplied by a pressure regulator to the first manifold, which constitutes the fluid source.

A significant aspect of the invention is the adjustability of the effective orifice areas of the individual digital valve elements in the open state, after these valve elements are assembled in the controller module. This permits the system to be calibrated so the pressure in the second manifold is virtually independent of tolerance variations of the parts of the digital valve elements and the module and is also a highly linear and repeatable function of the combinations of states of the digital valve elements. The controller module is calibrated by opening each valve element in turn and adjusting its effective orifice area until the pressure in the second manifold is a desired value that represents such valve element.

A feature of the invention is the control of the relationship between the pressure drop across the digital valve elements and the pressure drop across the orifice having the fixed cross-sectional area to provide the highest possible degree of linearity over the pressure range in the second manifold. In one embodiment, the fixed orifice is a hole. Flow through the open digital valve elements and the orifice is maintained at sonic velocity over the entire range of pressures established in the second manifold. In another embodiment, where the maintenance of sonic flow over the entire range of pressures is impractical, the fixed orifice is a tube. The nonlinearity of the pressure drop across the tube as a function of the mass flow rate through the tube, is offset by the complementary nonlinearity of the pressure drop across each digital valve element as a function of mass flow rate through it at subsonic velocity.

BRIEF DESCRIPTION OF THE DRAWINGS

The features of a specific embodiment of the best mode contemplated of carrying out the invention are illustrated in the drawings, in which:

FIG. 1 is a schematic block diagram of a fluid flow control system incorporating the principles of the invention;

FIG. 2 is a perspective view of one-half of one embodiment of the controller module represented in block form in FIG. 1;

FIG. 3 is an exploded perspective view of one of the digital valve elements depicted in FIG. 2;

FIG. 4 is a schematic diagram illustrating the calibration set-up for the controller module of FIG. 2;

DETAILED DESCRIPTION OF THE DRAWINGS

Figure 7:
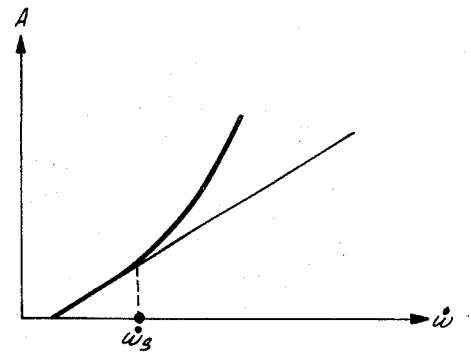
FIGS. 7 and 8 are graphs depicting the functional relationship among mass flow rate, effective orifice area, and pressure in the controller module of FIGS. 5 and 6.

In FIG. 1, a digital computer 10 controls a plug 11 of an analog valve that is disposed in a fluid system to regulate flow. The single line arrows represent electrical connections, the solid double lined arrows represent fluidic, i.e., hydraulic or pneumatic connections, and the dashed double lined arrow represents a mechanical connection. The output of digital computer 10 comprises a plurality of binary signals together representing in a weighted binary code a digital command for positioning plug 11. The nature of the binary code is not essential to the invention. For example, a straight geometric progression of two, a modified geometric progression of two as taught in application Ser. No. 64,142, or an equal weighting of all the signals could be employed. For the purpose of discussion, it is assumed that the binary code is a seven digit straight binary progression of two, i.e., the binary signals are weighted 1, 2, 4, 8, 16, 32, and 64. Such a code, which is preferable if the pressure is not too high and the flow rate is not too large, permits accuracy to about 0.1 pounds per square inch gauge (psig) within a pressure range of 12 psig. The binary output signals produced by digital computer 10 are coupled to a controller module 12 where they respectively actuate an equal number of bistable digital valve elements (not shown in FIG. 1). A source 13 of air under pressure is supplied by a pressure regulator 14 to an upstream manifold in controller module 12. Regulator 14, which has an adjustable pressure setting, supplies air from source 13 to the upstream manifold so as to maintain the pressure in the upstream manifold constant. In other words, the upstream manifold is maintained at a regulated pressure. The digital valve elements couple the upstream manifold to a downstream manifold. An orifice having a fixed cross-sectional area couples the downstream manifold to the atmosphere, represented in FIG. 1 by a block 15. The pressure established in the downstream manifold depends upon the states, i.e., open or closed, of the individual digital valve elements, which are controlled by the respective binary output signals of digital computer 10. (In practice, interfacing equipment would be interposed between computer 10 and the actuating solenoid coils of the digital valve elements. This equipment could comprise a buffer register to convert the intermittent computer output into a continuous output and amplifiers to provide sufficient power to drive the coils.) In other words, the downstream manifold is maintained at an unregulated pressure. When a binary output signal of digital computer 10 is one value, the corresponding digital valve element is closed, and when it is the other value, the corresponding digital valve element is open. The effective orifice areas of the digital valve elements in the open state are related to each other in the same ratio as the respective binary output signals of digital computer 10 are weighted. Accordingly, the sum of the effective orifice areas of the open digital valve elements in control module 12 is proportional to the number represented by the binary output signals from digital computer 10. The pressure in the downstream manifold is to a degree a linear function of the sum of the effective orifice areas of the open digital valve elements. Thus, the degree of linearity is an important factor in the performance of controller module 12.

The downstream manifold of controller module 12 is connected to a pressure responsive or sensitive analog actuator 17, such as a movable piston or diaphragm that is mechanically connected to plug 11 of the analog valve. As represented by a block 18, the position of plug 11 affects the dynamic conditions of the fluid system. The dynamic conditions of the fluid system are detected by a sensor 19, which produces one or more feedback signals representative of the dynamic conditions. The electrical feedback signal is coupled from sensor 19 to an analog-to-digital converter 20 where it is converted to a digit binary representation for application to digital computer 10. Digital computer 10 continually readjusts the command signal on the basis of the change of the dynamic conditions detected by sensor 19. Although the invention is disclosed in FIG. 1 in connection with a closed loop control system, it can also be employed in an open loop control system or in a system that feeds set point pressures to a closed loop fluidic controller.

In FIG. 2, one embodiment of half of control module 12 is shown in detail; the other half of control module 12 is a mirror image of the half shown. A disc shaped core 30 is disposed in a cylindrical recess 31 of a housing 32. Housing 32 has a cover 33, which is secured to housing 32 by bolts (not shown). Formed around the periphery of core 30 is an annular slot that defines with the adjacent surface of recess 31 an upstream manifold 34. Similarly, formed around the periphery of core 30 at one end is an annular slot that defines with the adjacent surface of recess 31, a downstream manifold 35. Distributed around the periphery of core 30 are seven bistable, digital valve elements, such as those designated 36, 37, 38, and 39. The digital valve elements are arranged in a circle in order of increasing cross-sectional orifice area. To maintain upstream manifold 34 at a regulated pressure, air is supplied to it through a fitting not represented in FIG. 2. One or more bleed orifices such as a hole 64 having a fixed cross-sectional area is formed in core 30 between manifolds 34 and 35. The cross-sectional area of hole 64 is designed to provide a desired minimum pressure in downstream manifold 35 when all the digital valve elements are in the closed state. One or more exhaust orifices such as hole 65 having a fixed cross-sectional area is formed in housing 32 between manifold 35 and the ambient atmosphere outside housing 32. As used in this specification, a hole is an orifice having a length that is short relative to its diameter. The cross-sectional area of hole 65 is designed so a desired maximum air flow rate through the controller module is not exceeded when all the digital valve elements are in the open state. Manifolds 34 and 35 are sealed from each other and the space within housing 32 above core 30 by O-rings 66 and 67 that are retained in respective grooves formed in the periphery of core 30, by an O-ring 68 that is retained in a groove formed in the end of core 30, and O-rings individual to the digital valve elements, such as an O-ring 69.

Digital valve element 36, which is shown disassembled in FIG. 3, is described as representative of the other six digital valve elements. A plug 45 and an orifice 46 determine the fluid flow through digital valve element 36, i.e., its orifice area in the open state. Orifice 46 is formed by a precision drilling operation in an insert 47, which is press fitted into a bore of standard size extending between manifolds 34 and 35. A bore 48 of larger standard size extends between upstream manifold 34 and the exterior of core 30 in alignment with orifice 46. A plug housing 49 has a threaded connection 50 with bore 48. At the end of housing 49 is a screwdriver slot 51 (FIG. 2) for turning plug housing 49. Plug housing 49, serves as a core for a solenoid coil 52. A central guide chamber 53, which is formed within plug housing 49, is closed at one end and open at the other end toward upstream manifold 34. Plug 45 moves through chamber 53 between extreme positions defined by the distance between the closed end of chamber 53 and orifice 46. A compression spring 54, which is kept in a recess within the end of plug 45 facing the closed end of chamber 53, bears against the closed end of chamber 53. Thus, when coil 52 is not energized, plug 45, urged by spring 54, bottoms against orifice 46 to place digital valve element 36 in the closed state. plug 45 seals orifice 46 so no fluid can flow therethrough from manifold 34 to manifold 35. When coil 52 is energized, it draws plug 45, which is made from a magnetic material, further into chamber 53 until it bottoms against the closed end thereof. A sheath 55 fits snugly around housing 48, and a retaining ring 56 secures plug housing 49 against rotation relative to core 30. A terminal block 60 and core 30 are secured to housing 32 by a bolt 61. Wires (FIG. 3) for energizing coil 52 and the solenoid coils associated with the other digital valve elements extend to respective terminals 62 on block 60. A cable (not shown) that transmits the binary output signals from digital computer 10 extends through a cable entrance 63 in housing 32, the wires of the cable being connected to the appropriate terminals 62. Insert 46 is preferably made from a very hard material so the cross-sectional area of orifice 46 does not change due to wearing away of material. Plug 45 comprises a pin 70 having a tapered end and a base 71 having a key way 72 (FIG. 3) that allows free travel of fluid past the plug for purposes of pressure balancing. Only base 71 must be made from a magnetic material; pin 70 could be a wear resistant non-magnetic material. Plug housing 49 comprises three parts brazed together to form an integral component, namely, a cap 73 (FIG. 3) made from a magnetic material, a base 74 (FIG. 3) made from a magnetic material, and a core 75 (FIG. 2) made from a non-magnetic material. The windings of coil 52 are distributed on core 75 between flanges 76 and 77 formed on the adjacent ends of cap 73 and base 74, respectively. An O-ring 69 is retained in a groove formed in base 74 between male threads 78, which mate with matching female threads in bore 48 to form threaded connection 50, and the open end of central chamber 53. The remaining digital valve elements are identical to valve element 36 except for the size of the orifice 46 and the pin 70 of the plug.

The parts of the digital valve elements are dimensioned so the tapered end of pin 70 remains inside orifice 46 when plug 45 is bottomed against the closed end of chamber 53 in the one extreme position, i.e., the open state of the valve element. Thus, the digital valve elements present annular orifices to the flow of fluid. The cross-sectional areas of these annular orifices are individually adjustable by changing the distance from the closed end of the chamber 53 to the insert 47, thereby changing the inside diameter of the annular orifice. This is done by turning the plug housing 49 within its threaded connection 50 with the bore 48 so as to vary the distance between the closed end of the chamber 53 and the orifice 46 and, thus, the length of the stroke of the plug 45. Preferably, the plug housing is first screwed into the bore, the retaining ring 56 is then loosely attached to core 30 by its fasteners, and the plug housing is turned by placing a screwdriver in slot 51 until the cross-sectional orifice area is adjusted to precisely the desired value. Finally, the fasteners on the retaining ring are tightened so the retaining ring bears against the base flange 77 of the plug housing, to load the threads of the thread connection with the bore, thereby locking the plug housing in the adjusted position. As illustrated in FIG. 2, the base flange and the retaining ring are spaced from the surface of core 30 when the plug housing is locked.

In summary, the effective orifice area of each digital valve element is adjusted in the described manner to precisely the desired value. Since there are actually a number of different orifices formed in each digital valve element, the term "effective orifice area" is used in this specification to indicate the resultant orifice area presented by each valve element considered as a simple hole having a uniform cross-sectional area coupling the upstream manifold to the downstream manifold.

Figure 6:
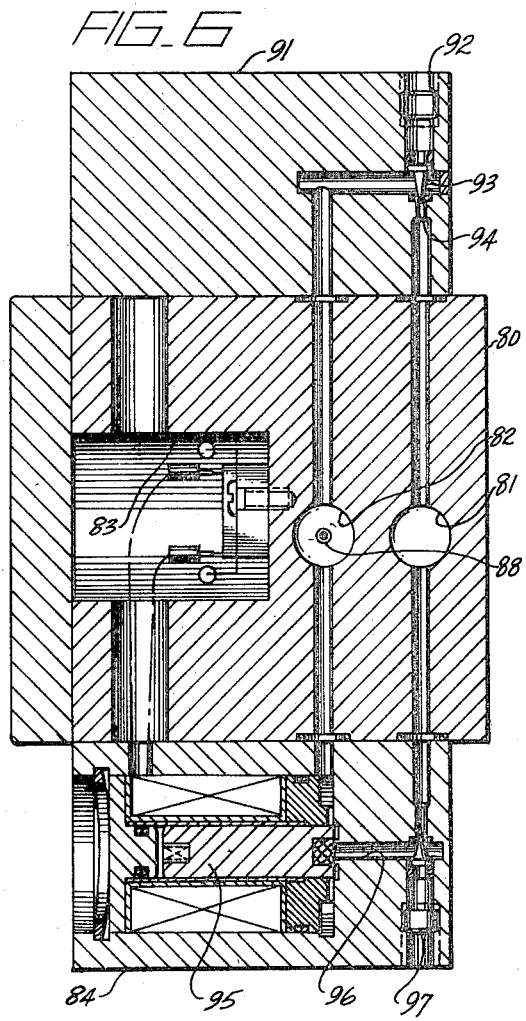
FIG. 6 is a sectional view of the controller module of FIG. 5.
Figure 5:
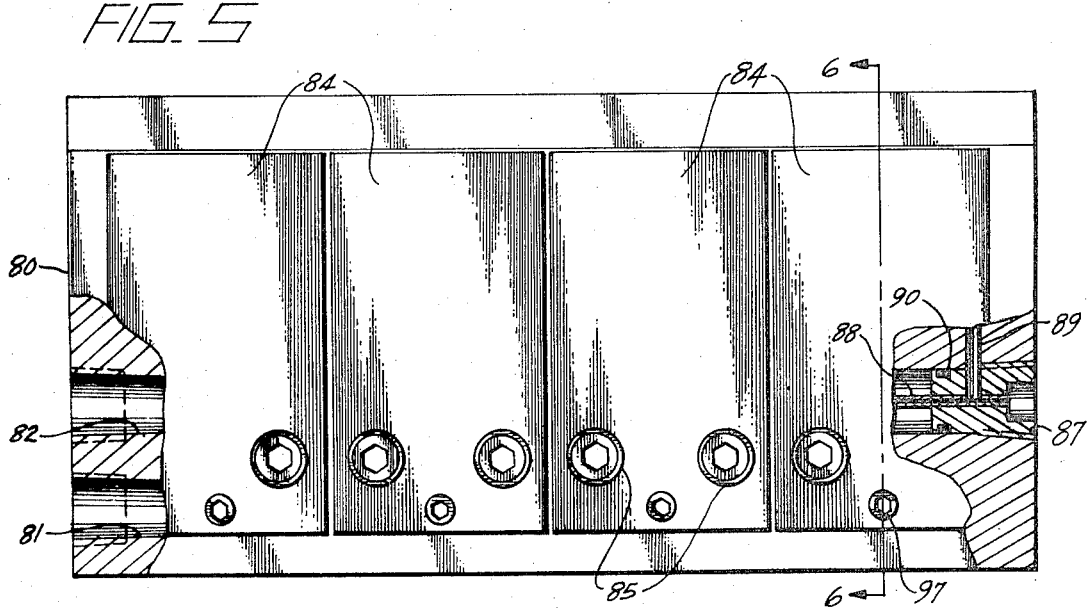
FIG. 5 is a side elevation view partially in section of an alternative embodiment of the controller module represented in block form in FIG. 1.

In FIGS. 5 and 6 another embodiment of controller module 12 is shown. This embodiment comprises the digital flow control module disclosed in our concurrently filed application Ser. No. 169,930 titled, "Fluid Flow Control System and Method for Calibrating Same," with two modifications, which are depicted in FIGS. 5 and 6 and described below. FIG. 6 is rotated 90° to place it in the same orientation as the corresponding view of the concurrently filed application for ease of comparison. Briefly, the module comprises a main block 80 having an upstream manifold 81, a downstream manifold 82, and a wiring cavity 83. A plurality of sub-blocks 84, each of which houses a digital valve element, are attached to main block 80 by fasteners such as screws 85. The construction of blocks 84 is described in detail in our copending application filed concurrently herewith, the disclosure of which is fully incorporated herein by reference. Each block 84 has a solenoid operated plug 95 that moves to the right, as viewed in FIG. 6, to seal the end of a passage 96, and moves to the left to clear passage 96 for fluid flow from upstream chamber 81 to downstream chamber 82. A set screw 97 is adjusted to control the effective orifice area of the passage between downstream manifold 81 and passage 96, and, accordingly, the effective orifice area of the digital valve element. Set screws 97 are exposed to the exterior of the module (see FIG. 5).

The first modification is that downstream manifold 82 extends through main block 80 from end to end. At one end, downstream manifold 82 is sealed by a threaded plug 87. One end of a tube 88 fits into plug 87 so the other end of tube 88 extends into downstream manifold 82. As used in this specification, a tube is an orifice having a length that is long relative to its inside diameter, as distinguished from a hole. A conduit 89 extends through plug 87 and main block 80 between downstream manifold 82 and wiring cavity 83. Tube 88 and conduit 89 form the exhaust orifice between the downstream manifold and the atmosphere. The dimensions of tube 88 are such that they in essence determine the flow rate through the exhaust orifice to the exclusion of the dimensions of conduit 89. An O-ring 90 retained by a groove in plug 87 prevents leakage of air directly from manifold 82 to conduit 89. Air leaving downstream manifold 82 through tube 88 and conduit 89 passes from cavity 83 to the atmosphere. In so doing, this air purges cavity 83 of any flammable gases that may be in the vicinity of the module.

The second modification is that one of the digital valve element sub-blocks is replaced by a sub-block 91, which houses the bleed orifice between upstream manifold 81 an downstream manifold 82. The effective orifice area of the bleed orifice is adjusted by turning an externally exposed set screw 92. Set screw 92 has at its end a tapered slug 93 that extends into a cylindrical passage 94 to form an adjustable annular space. The effective orifice area of the bleed orifice is determined by the distance that slug 93 extends into passage 94. From FIG. 6, it can be seen that except for the absence of a plug assembly, and its associated solenoid assembly, sub-block 91 is identical to sub-blocks 84.

A high degree of linearity over the range of the pressures produced in the downstream manifold is achieved by controlling the relationship between the pressure drop across the digital valve elements and the pressure drop across the exhaust orifice. It is preferable to maintain the ratio of the absolute pressure in the upstream manifold to the absolute pressure in the downstream manifold larger than the critical pressure ratio, i.e., about 2:1 for air, and to maintain the ratio of the absolute pressure in the downstream manifold to the atmospheric pressure larger than the 2:1 critical pressure ratio over the entire range of pressures in the downstream manifold. In this case, the air flow through the open digital valve elements at sonic velocity isolates the upstream manifold from the downstream manifold. In other words, variations in the pressure in the downstream manifold do not affect the mass flow rate through the open digital valve elements. The air flow through the open digital valve elements at sonic velocity establishes the critical pressure ratio between the upstream manifold and the digital valve elements. Since the pressure in the upstream manifold is constant, the mass flow rate through the open digital valve elements is proportional to, i.e., a linear function of, the sum of the effective orifice areas of the open digital valve elements, independent of the pressure in the downstream manifold. In this case, the exhaust orifice is a hole. As a result of the airflow through the exhaust orifice at sonic velocity, the pressure in the downstream manifold is directly proportional to, i.e., a linear function of, the mass flow rate of the air passing through the exhaust orifice. Continuity dictates that the mass flow rate through the exhaust orifice equals the mass flow rate through the open digital valve elements. Therefore, the pressure in the downstream manifold is directly proportional to, i.e., a linear function of, the sum of the effective orifice areas of the open digital valve elements. By way of example, the pressure range in the downstream manifold could be 15 to 30 psig and the regulated pressure in the upstream manifold could be 75 psig.

However, a standard pressure range for valve actuators and pneumatic controllers in processing plants is 3 to 15 psig. Thus, a typical pressure range in the downstream manifold is 3 to 15 psig. For this case, the exhaust orifice hole would have to be coupled to a subatmospheric pressure rather than the atmosphere in order to maintain the 2:1 pressure ratio across the exhaust orifice for the entire pressure range in the downstream manifold. This would be achieved by coupling the exhaust orifice to a plenum chamber that is partially evacuated by a vacuum pump, rather than to the atmosphere. There may also be other types of devices available for maintaining air flow at sonic velocity from the downstream manifold to the atmosphere, without maintaining at least a 2:1 pressure ratio.

Figure 8:
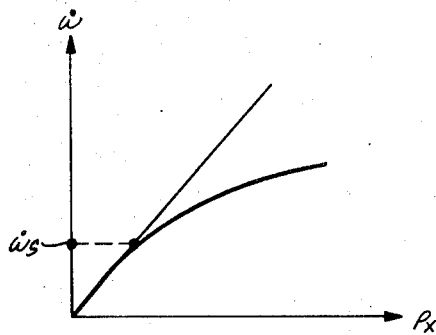

One important aspect of the invention is the maintenance of a high degree of linearity without maintaining the airflow through the exhaust orifice at sonic velocity over the entire pressure range in the downstream manifold. Specifically, the exhaust orifice takes the form of tube 88 in FIG. 5 rather than a hole. Assuming that the pressure range in the downstream manifold is 3 to 15 psig, suitable dimensions for tube 88 are a length of 4 inches and an inside diameter of 0.030 inch, and a suitable value for the regulated pressure in the upstream manifold is 29 psig. For airflow through tube 88 at a subsonic velocity, the mass flow rate therethrough, $\dot{w}$, is a non-linear, square root function of the pressure, $P_x$, in the downstream manifold, as illustrated in FIG. 8. To compensate for this square root relationship, the regulated pressure in the upstream manifold is intentionally selected so the air also flows through the digital valve elements at a subsonic velocity over at least part of the pressure range in the downstream manifold. In such case, the sum, A, of the effective orifice area of the open digital valve elements is a non-linear, approximately square function of the mass flow rate, $\dot{w}$, through the open digital valve elements, as illustrated in FIG. 7. For small mass flow rates, where the square root relationship between $\dot{w}$ and $P_x$ is approximately linear, the regulated pressure in the upstream manifold is such that the airflow through the open digital valve elements is essentially at sonic velocity. As the mass flow rate increases and the relationship between $\dot{w}$ and $P_x$ becomes more non-linear, which is illustrated in FIG. 8 by the deviation of the heavy curved line from the light straight line beginning at $\dot{w}_s$, the air velocity through the open digital valve elements drops. As the air velocity through the open digital valve elements drops, the relationship between $\dot{w}$ and A becomes non-linear, which is illustrated in FIG. 7 by the deviation of the heavy curved line from the light straight line beginning at $\dot{w}_s$. For a given pressure range in the downstream manifold, the length and inside diameter of tube 88 and the regulated pressure in the upstream manifold are selected so the square relationship between $\dot{w}$ and A as nearly as possible offsets, i.e., compensates for, the square root relationship between $\dot{w}$ and $P_x$. The result is a high degree of linearity between $P_x$ and A.

If the requirements for the degree of linearity are not so high, airflow through the digital valve elements at sonic velocity could be maintained without regard for the effect of the mass flow rate through the exhaust hole or tube on the pressure in the downstream manifold. The regulated pressure in the upstream manifold is simply selected so it is at least twice as large as the highest pressure in the downstream manifold. This gives satisfactory linearity for some applications.

FIG. 4 represents a calibration setup for establishing the desired pressure in the downstream manifold for each combination of states of the seven digital valve elements. The downstream manifold is coupled to a very accurate manometer. For the purpose of discussion, it is assumed that it is desired to establish in the downstream manifold pressures ranging from 3 psig to 15 psig, since this is a standard range of input pressures for analog valve actuators. It is further assumed that the bleed orifice is nominally designed to produce a pressure of 3 psig in the downstream manifold when all the digital valve elements are in the closed state and the exhaust orifice is designed to release air at a maximum rate of 0.3 cubic feet per minute at standard temperature and pressure when all the digital valve elements are in the open state. The calibration procedure differs somewhat for the embodiment of FIGS. 2 and 3, and the embodiment of FIGS. 5 and 6.

In the case of the embodiment of FIGS. 5 and 6, the first step in the calibration operation is to zero the manometer in the absence of pressure in the downstream manifold. The second step is to turn set screw 92 to adjust the effective orifice area of the bleed orifice in block 91, so the pressure in the downstream manifold is precisely 3 psig with all the digital valve elements in their closed state. Thereafter, in successive steps, each digital valve element is individually opened in turn, its effective orifice area is adjusted by turning screw 86 until the manometer indicates the desired pressure in the downstream manifold representative of such valve element, and it is then closed. It has been found that the highest degree of linearity can be achieved for all the combinations of states of the digital valve elements when the effective orifice areas of the various digital valve elements are adjusted so the pressure in the downstream manifold is slightly offset from its nominal value by an empirically determined amount. For example, when the digital valve element weighted 4 is open, it may be empirically determined that a higher degree of overall linearity is achieved when this digital valve element is adjusted to produce a pressure in the downstream manifold that is 3.378 psig rather than the nominal value of 3.375 psig.

In the case of the embodiment of FIGS. 2 and 3, the first step in the calibration operation is to zero the manometer in the absence of pressure in the downstream manifold. The second step is to set the pressure regulator so the pressure in the downstream manifold is precisely 3 psig with all the digital valve elements in their closed states. This enables dimensional variations in the bleed orifice, exhaust orifice, and upstream and downstream manifolds to be compensated by the regulated pressure established in the upstream manifold. In other words, the regulated pressure in the upstream manifold is set to a value slightly different from its nominal value of 75 psig to compensate for these tolerance variations in the construction of the controller module, but still high enough to maintain at least a 2:1 absolute pressure ratio between manifolds over the entire range of pressures in the downstream manifold. The third step is to place the digital valve element having the smallest effective orifice area in the open state and to adjust its stroke until the manometer indicates the desired pressure in the downstream manifold for this combination of states of the digital valve elements. The fourth step is to place the digital valve element with the second smallest effective orifice area in the open state and to adjust its stroke until the manometer indicates the downstream manifold is at the pressure desired for this combination of states of the digital valve elements. This procedure is continued, each digital valve element being opened in order of increasing effective orifice area until all the digital valve elements are open together. After each valve element in the order is opened, before opening the next valve element in the order, the stroke of the just opened valve element is adjusted until the manometer indicates the desired pressure in the downstream manifold for that combination of digital valve element states. The adjustment of the strokes of the individual valve elements compensates for variations in tolerances of the parts of these valve elements so the effective orifice areas are weighted precisely according to the binary code of the binary signals that are coupled to the controller module.

In summary, in the calibration procedure described in connection with the embodiment of FIGS. 2 and 3, the regulator is set to compensate for variations in the dimensions of the bleed orifice, the outlet orifice, and the manifolds, while the strokes of the digital valve elements are set to compensate for tolerance variations of their parts. If it were desired to establish zero pressure in the downstream manifold when all the digital valve elements are in the closed state, the bleed orifice would be eliminated. In this case, the digital valve element having the smallest cross-sectional orifice area, would assume the role of the bleed orifice in the calibration procedure. In other words, this digital valve element would be opened and the regulator would be set to establish the desired pressure in the downstream manifold without adjusting the stroke of this digital valve element. The strokes of the remaining digital valve elements would then be adjusted in turn to provide cross-sectional orifice areas that are properly weighted relative to the digital valve element having the smallest cross-sectional orifice area.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, it would be possible to establish a sub-atmospheric pressure in manifold 34 or 81, thereby reversing the direction of fluid flow through the controller module. (Such an arrangement is limited, however, in that the maximum range of pressure is 14.7 psi.) The exhaust orifice could be coupled to an additional manifold or plenum chamber at some constant pressure other than atmospheric. As mentioned above, this would be particularly useful if a sub-atmospheric pressure downstream of the exhaust orifice were sought, in order to maintain flow at sonic velocity. The digital valve elements and the exhaust orifice could be interchanged, i.e., the exhaust orifice coupling the two manifolds and the digital valve elements coupling one of the manifolds to the atmosphere. The invention is also applicable to digital signals other than binary signals, such as trinary signals. (In such case, the digital valve elements would have to be modified to have the same number of states as the digital signals, i.e., three.) Instead of a pressure responsive actuator coupled to the downstream manifold, it would be possible to sense the pressure in the downstream manifold by monitoring its flow rate with a flowmeter, such as turbine flowmeter. In this case, the angular velocity of the turbine is representative of the pressure in the downstream manifold. Other systems of digital valve elements could be employed as controller module 12. For example, the system disclosed in one of the two cross referenced applications would be very useful if very high pressure and large flow rates are involved. Further, the particular system of digital valve elements disclosed in FIGS. 2 and 3 could be employed without regulator 14, exhaust orifice 65, and bleed orifice 64 to handle process fluid flow in a process operation involving moderate pressures and flow rates.

What is claimed is:

1. A fluid control system comprising;

a plurality of sources of digital signals together representing in a weighted code a digital command;

a fluid chamber;

a source of a fluid at a constant pressure;

a receiver of the fluid at a constant pressure lower than the source pressure;

means for coupling the fluid from the source to the chamber;

means for coupling the fluid from the chamber to the receiver;

one of the coupling means comprising one or more orifices having together a fixed cross-sectional area;

the other coupling means comprising a plurality of individually actuatable, digital valve elements capable of assuming a number of different states equal to the digital values that the digital signals assume, the valve elements corresponding respectively to the sources of digital signals;

means responsive to the sources of digital signals for individually controlling the states of the corresponding valve elements depending upon the digital values of the digital signals to produce in the chamber a pressure that is representative of the digital command; and means for sensing the pressure in the chamber.

2. The control system of claim 1, in which the sensing means comprises a movable, pressure responsive actuator and an analog valve having a flow controlling plug mechanically coupled to the actuator, the plug position being representative of the digital command.

3. The control system of claim 1, in which there is provided another chamber maintained at one of the constant pressures by the fluid source or receiver, one of the coupling means interconnects the two chambers, and the other coupling means interconnects the first named chamber to the atmosphere, which is the other constant pressure.

4. The control system of claim 1, in which there is provided another chamber maintained at one of the constant pressures by the fluid source or receiver, the digital valve elements interconnect the two chambers, and the orifice having a fixed cross-sectional area couples the first named chamber to the atmosphere, which is the other constant pressure.

5. The control system of claim 1, in which the plurality of sources of digital signals comprises a digital computer producing a plurality of binary signals together representing in a weighted binary code the digital command, the movable member comprises an actuator and an analog valve having a flow determining plug mechanically coupled to the actuator, the control system additionally comprising a fluid network in which the analog valve is disposed to control fluid flow, means for sensing the dynamic conditions of the fluid network affected by the analog valve, and means for coupling a signal representative of the sensed dynamic conditions to the digital computer to compute the digital command.

6. The control system of claim 1, in which each of the valve elements has means for adjusting the effective orifice area.

7. The control system of claim 1, in which the constant pressure of the fluid coupled by the valve elements is sufficient to create flow through each valve element at sonic velocity over the entire range of pressure produced in the chamber.

8. The control system of claim 1, in which the constant pressure of the fluid coupled by the orifice having a fixed cross section is sufficient to create flow therethrough at sonic velocity over the entire range of pressure produced in the chamber.

9. The control system of claim 1, in which flow of the fluid through the digital valve elements and the orifice having a fixed cross-sectional area is maintained at sonic velocity over the entire range of pressure produced in the chamber.

10. The control system of claim 1, in which the orifice having a fixed cross-sectional area is a tube with a mass flow rate that is a square root function of the pressure in the chamber and the digital valve elements have a mass flow rate that is a square function of the sum of their effective areas, the two functions compensating for each other.

11. A fluid control system comprising:
an element that is movable responsive to pressure;
a plurality of sources of binary signals together representing in a weighted binary code a digital command for positioning the movable element;
a first manifold at a regulated fluid pressure;
a second manifold at an unregulated fluid pressure;
a plurality of individually actuatable, bistable digital valve elements interconnecting the first and second manifolds, the bistable valve elements corresponding respectively to the sources of binary signals and having effective orifice areas weighted in accordance with the binary code;
means responsive to the sources for individually opening and closing the corresponding bistable valve elements depending upon the binary values of the binary signals to produce in the second manifold a fluid pressure that is representative of the states of the valve elements; and
means responsive to the fluid pressure in the second manifold for positioning the movable element.

12. The control system of claim 11, in which the second manifold is coupled to the atmosphere by one or more orifices having a resultant fixed cross-sectional area, the control system additionally comprising a source of fluid under pressure and a pressure regulator coupling the source to the first manifold so as to maintain the first manifold at a substantially constant fluid pressure.

13. The control system of claim 12, in which the means for positioning the movable element comprises a pressure responsive actuator mechanically coupled to the movable element and the movable element comprises the plug of an analog valve.

14. The control system of claim 13, in which the plurality of sources of binary signals comprises a digital computer having an output in the form of binary signals.

15. The control system of claim 14, additionally comprising means for sensing dynamic fluid conditions affected by the position of the plug of the analog valve and means for coupling to the digital computer a plurality of binary signals together representing in a weighted binary code digital feedback for changing the digital command represented by the binary signal output of the computer.

16. The control system of claim 15, additionally comprising a bleed orifice having a fixed cross-sectional area coupling the first and second manifolds.

17. The control system of claim 16, in which the orifice coupling the second manifold to the atmosphere is a tube, the mass flow rate through the tube being a square root function of the pressure in the second manifold, the regulated pressure in the first manifold being such that the mass flow rate through the open digital valve elements is approximately a square function of the sum of their effective orifice areas that compensates for the square root function of the tube so the pressure in the second manifold is a linear function of the sum of their effective orifice areas.

18. The control system of claim 16, in which the regulated pressure in the first manifold is such that flow through the open digital valve elements is at sonic velocity for all the combination of states of the digital valve elements.

19. The control system of claim 18, in which the flow through the orifice coupling the second manifold to the atmosphere is at sonic velocity for all the combinations of states of the digital valve elements.

20. A fluidic control system comprising:
an analog valve having a plug the position of which controls the flow rate therethrough;
a plurality of sources of binary signals together representing in a weighted binary code a digital command for positioning the movable element of the analog valve;
a first manifold;
a source of fluid under pressure;
a pressure regulator coupling the source to the first manifold so the pressure of the fluid in the first manifold is constant;
a second manifold;
a plurality of individually actuatable, bistable digital valve elements interconnecting the first and second manifolds, the bistable valve elements corresponding respectively to the sources of binary signals and having effective orifice areas weighted in accordance with the binary code;
an exhaust tube coupling the second manifold to the atmosphere, the dimensions of the exhaust tube being selected to offset the nonlinearity between the flow rate through the open digital valve elements and the sum of their effective orifice areas;
means responsive to the sources for individually opening and closing the corresponding bistable valve elements depending upon the binary values of the binary signals to produce in the second manifold a fluid pressure that is representative of the states of the valve elements; and
means responsive to the fluid pressure in the second manifold for positioning the plug of the analog valve.

21. The control system of claim 20, additionally comprising means for adjusting the effective orifice areas of the individual digital valve elements.

22. The control system of claim 21, additionally comprising a bleed orifice between the first and second manifolds and means for adjusting the effective orifice area of the bleed orifice.

23. The control system of claim 20, additionally comprising a bleed orifice between the first and second manifolds and means for adjusting the effective orifice area of the bleed orifice.

24. A method for calibrating a fluid flow control system having a bleed orifice and plurality of binary digital valve elements interconnecting a first manifold and a second manifold, means for individually adjusting the effective orifice areas of the valve elements, a regulator for maintaining constant the pressure in the first manifold, and an orifice from the second manifold to a constant pressure different from the pressure in the first manifold, the method comprising the steps of:

adjusting the pressure in the second manifold to a desired minimum value with all the valve elements in the closed state;

after the pressure is adjusted to the desired minimum value, opening each valve element in turn; and after each valve element is opened, adjusting the effective orifice area of such valve element until the pressure in the second manifold reaches a desired value representing such valve element.

25. The method of claim 24, in which at least some of the valve elements have different cross-sectional orifice areas, the opening step comprising opening each valve element in the order of increasing cross-sectional orifice areas without closing any of the previously opened valve elements.

26. The method of claim 24, in which the first recited adjusting step comprises adjusting the regulator setting.

27. The method of claim 24, in which the first recited adjusting step comprises adjusting the effective orifice area of the bleed orifice.

* * * * *